United States Patent
Abuelsaad et al.

(10) Patent No.: US 9,654,358 B2
(45) Date of Patent: May 16, 2017

(54) MANAGING USER PRIVILEGES FOR COMPUTER RESOURCES IN A NETWORKED COMPUTING ENVIRONMENT

(71) Applicant: International Business Machines Corporation, Armonk, NY (US)

(72) Inventors: Kelly Abuelsaad, Poughkeepsie, NY (US); Lisa Seacat DeLuca, San Francisco, CA (US); Soobaek Jang, Hamden, CT (US); Daniel C. Krook, Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 222 days.

(21) Appl. No.: 13/741,959

(22) Filed: Jan. 15, 2013

(65) Prior Publication Data

US 2014/0201345 A1 Jul. 17, 2014

(51) Int. Cl.
*G06F 15/173* (2006.01)
*H04L 12/24* (2006.01)
*H04L 12/911* (2013.01)
*G06F 21/60* (2013.01)

(52) U.S. Cl.
CPC .......... *H04L 41/5067* (2013.01); *G06F 21/60* (2013.01); *H04L 47/70* (2013.01); *H04L 41/5083* (2013.01); *H04L 41/5096* (2013.01)

(58) Field of Classification Search
CPC ....... H04L 47/70; H04L 63/10; H04L 67/306; H04L 41/5067; H04L 41/5083; H04L 41/02; H04L 41/0206; H04L 41/0213; H04L 41/50; H04L 41/5003; G06F 21/60
See application file for complete search history.

(56) References Cited

U.S. PATENT DOCUMENTS

| 6,781,607 B1 | 8/2004 | Benham |
| 7,680,901 B2 | 3/2010 | Rechterman et al. |
| 7,761,404 B2 | 7/2010 | Chen et al. |

(Continued)

OTHER PUBLICATIONS

SharePoint Server 2010, "Plan user profiles", http://technet.microsoft.com/en-us/library/ee721054%28v=office.14%29.aspx, Published May 12, 2010, 8 pages.

(Continued)

*Primary Examiner* — Suraj Joshi
*Assistant Examiner* — Ayele Woldemariam
(74) *Attorney, Agent, or Firm* — William H. Hartwell; Maxine L. Barasch; Keohane & D'Alessandro PLLC

(57) ABSTRACT

Approaches for automatically managing user privileges for computer resources based on determined levels of expertise in a networked computing environment (e.g., a cloud computing environment) are provided. In a typical approach, a user profile associated with a prospective user of a set of computer resources in the networked computing environment may be accessed. The user profile may include information pertaining to a skill level of the prospective user with respect to the set of computer resources. Based on the information contained in the user profile, an expertise level of the prospective user with respect to the set of computer resources may be determined, and a corresponding score may be calculated. Based on the score, a level of user privileges for the set of computer resources may be provided.

15 Claims, 6 Drawing Sheets

(56) References Cited

U.S. PATENT DOCUMENTS

| | | |
|---|---|---|
| 7,818,804 B2 | 10/2010 | Marceau |
| 7,860,901 B2 | 12/2010 | Cheng et al. |
| 8,074,274 B2 | 12/2011 | Wang et al. |
| 8,136,147 B2 | 3/2012 | Koikara et al. |
| 8,214,905 B1 * | 7/2012 | Doukhvalov et al. .......... 726/24 |
| 8,811,663 B2 | 8/2014 | Brown et al. |
| 2008/0163366 A1 | 7/2008 | Chinya et al. |
| 2010/0011438 A1 | 1/2010 | Bartley et al. |
| 2012/0311156 A1 | 12/2012 | DeJana et al. |
| 2013/0019320 A1 * | 1/2013 | Ericsson et al. ................ 726/28 |
| 2013/0091068 A1 * | 4/2013 | Canning et al. ............. 705/319 |
| 2013/0227409 A1 * | 8/2013 | Das et al. ..................... 715/702 |
| 2014/0156652 A1 * | 6/2014 | Abiola ............... G06F 17/3053 707/723 |

OTHER PUBLICATIONS

Maitland, J., "Keeping Control Isn't Easy", Chapter 4: Cloud-Based Infrastructure, Search-CloudConnputing.com, 13 pages.

Mell, P. et al., "The NIST Definition of Cloud Computing", National Institute of Standards and Technology, Information Technology Laboratory, Vers. 15, Oct. 7, 2009, 2 pages.

Maitland, J., "Keeping Control Isn't Easy", Chapter 4: Cloud-Based Infrastructure, SearchCloudComputing.com, Publication Date: Oct. 2009, 17 pages.

\* cited by examiner

MANAGING USER PRIVILEGES FOR COMPUTER RESOURCES IN A NETWORKED COMPUTING ENVIRONMENT

TECHNICAL FIELD

In general, embodiments of the present invention relate to user privilege management. Specifically, embodiments of the present invention relate to the management of user privileges for computer resources in a networked computing environment (e.g., a cloud computing environment).

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

A cloud environment makes it easy for cloud providers to automate the provisioning of resources such as standardized server and desktop images for end users. This automation is an important benefit of cloud computing, as provisioning standardized resources does not typically require much customization and configuration. Challenges may exist, however, in that not all cloud consumers are at the same skill level, and therefore not all users should be granted the same usage privileges. Currently, the management of a user's privilege level is a manual process whereby a review of the user's expertise is manually performed and a corresponding privilege given based on what an administrator believes is appropriate. Given that many organizations have a large number of users whose expertise levels may change over time, such manual processes may be time consuming and inefficient.

SUMMARY

In general, aspects of the present invention relate to an approach for automatically managing user privileges for computer resources based on determined levels of expertise in a networked computing environment (e.g., a cloud computing environment). In a typical embodiment, a user profile associated with a prospective user of a set of computer resources in the networked computing environment may be accessed. The user profile may comprise information pertaining to a skill level of the prospective user with respect to the set of computer resources. Based on the information contained in the user profile, an expertise level of the prospective user with respect to the set of computer resources may be determined, and a corresponding score may be calculated. Based on the score, a level of user privileges for the set of computer resources may be provided. In addition, a user interface operated by the user to utilize the set of computer resources may be modified according to the user's determined level of expertise and/or privileges.

A first aspect of the present invention provides a computer-implemented method for managing user privileges for computer resources in a networked computing environment, comprising: accessing, in a computer storage device, a user profile associated with a prospective user of a set of computer resources in the networked computing environment, the user profile comprising information pertaining to a skill level of the prospective user with respect to the set of computer resources; determining an expertise level of the prospective user with respect to the set of computer resources based on the information contained in the user profile; calculating a score based on the expertise level; and providing a level of user privileges for the set of computer resources commensurate with the score.

A second aspect of the present invention provides a system for managing user privileges for computer resources in a networked computing environment, comprising: a bus; a processor coupled to the bus; and a memory medium coupled to the bus, the memory medium comprising instructions to: access, in a computer storage device, a user profile associated with a prospective user of a set of computer resources in the networked computing environment, the user profile comprising information pertaining to a skill level of the prospective user with respect to the set of computer resources; determine an expertise level of the prospective user with respect to the set of computer resources based on the information contained in the user profile; calculate a score based on the expertise level; and provide a level of user privileges for the set of computer resources commensurate with the score.

A third aspect of the present invention provides a computer program product for managing user privileges for computer resources in a networked computing environment, the computer program product comprising a computer readable storage media, and program instructions stored on the computer readable storage media, to: access, in a computer storage device, a user profile associated with a prospective user of a set of computer resources in the networked computing environment, the user profile comprising information pertaining to a skill level of the prospective user with respect to the set of computer resources; determine an expertise level of the prospective user with respect to the set of computer resources based on the information contained in the user profile; calculate a score based on the expertise level; and provide a level of user privileges for the set of computer resources commensurate with the score.

A fourth aspect of the present invention provides a method for deploying a system for managing user privileges for computer resources in a networked computing environment, comprising: providing a computer infrastructure being operable to: access, in a computer storage device, a user profile associated with a prospective user of a set of computer resources in the networked computing environment, the user profile comprising information pertaining to a skill level of the prospective user with respect to the set of computer resources; determine an expertise level of the prospective user with respect to the set of computer resources based on the information contained in the user profile; calculate a score based on the expertise level; and provide a level of user privileges for the set of computer resources commensurate with the score.

BRIEF DESCRIPTION OF THE DRAWINGS

These and other features of this invention will be more readily understood from the following detailed description of the various aspects of the invention taken in conjunction with the accompanying drawings in which.

Figure 1:
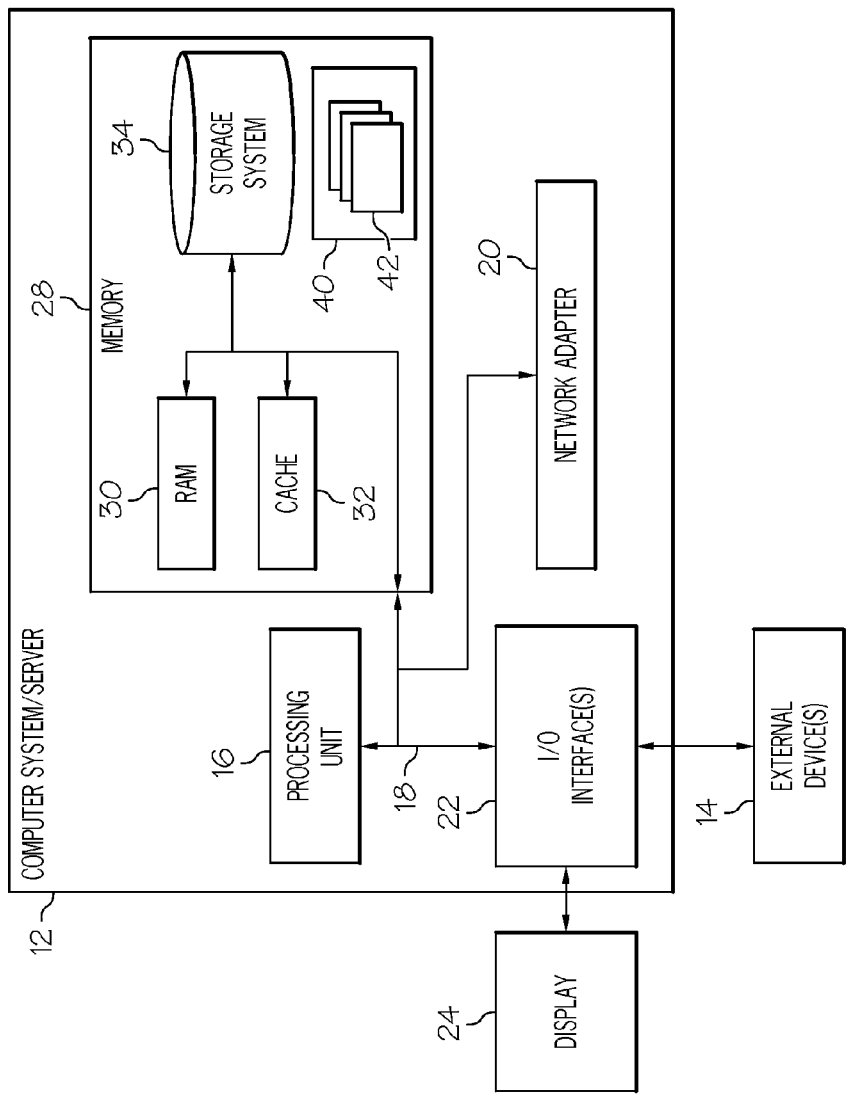
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, aspects of the present invention relate to an approach for automatically managing user privileges for computer resources based on determined levels of expertise in a networked computing environment (e.g., a cloud computing environment). In a typical embodiment, a user profile associated with a prospective user of a set of computer resources in the networked computing environment may be accessed. The user profile may comprise information pertaining to a skill level of the prospective user with respect to the set of computer resources. Based on the information contained in the user profile, an expertise level of the prospective user with respect to the set of computer resources may be determined, and a corresponding score may be calculated. Based on the score, a level of user privileges for the set of computer resources may be provided. In addition, a user interface operated by the user to utilize the set of computer resources may be modified according to the user's determined level of expertise and/or privileges.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computer resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computer resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computer resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
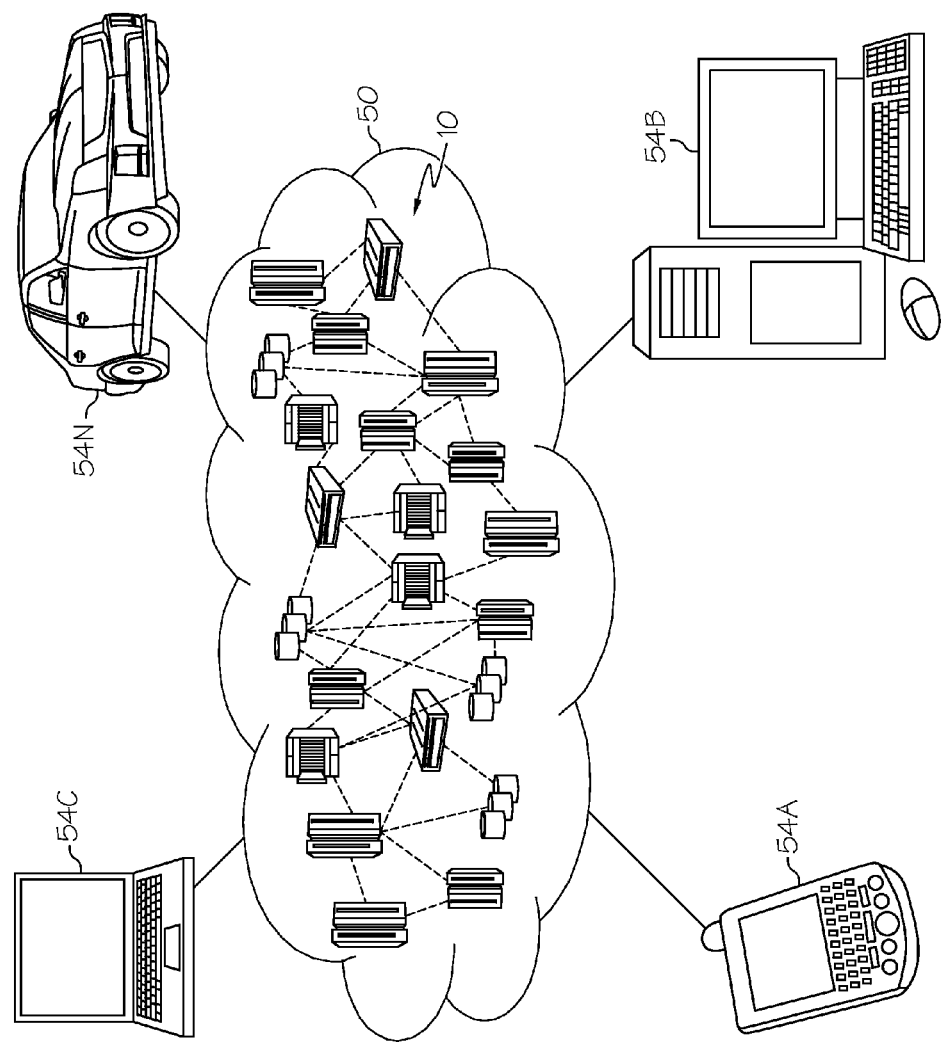
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
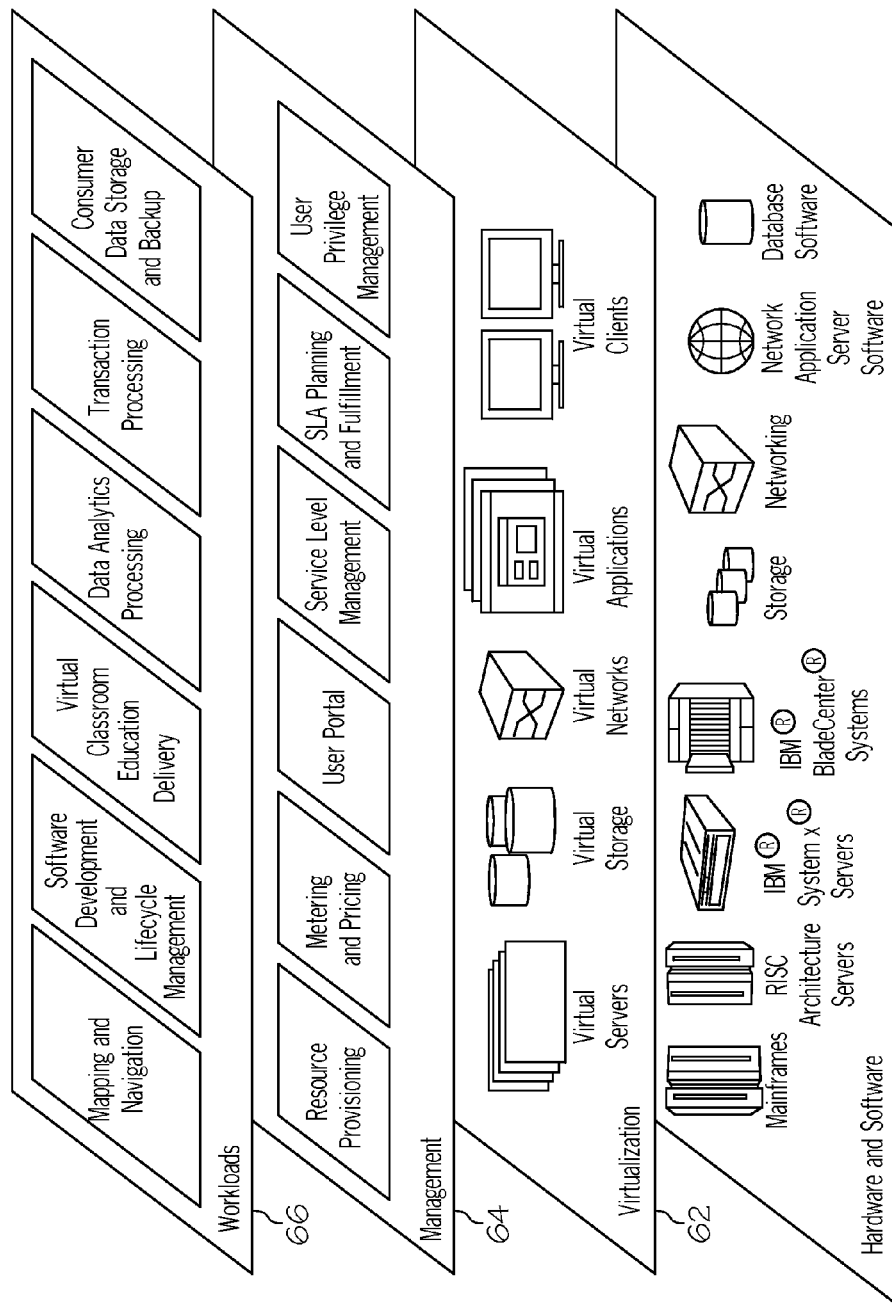
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM System X® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computer resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computer resources for which a future requirement is anticipated in accordance with an SLA. Further shown in management layer is user privilege management, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the user privilege management functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
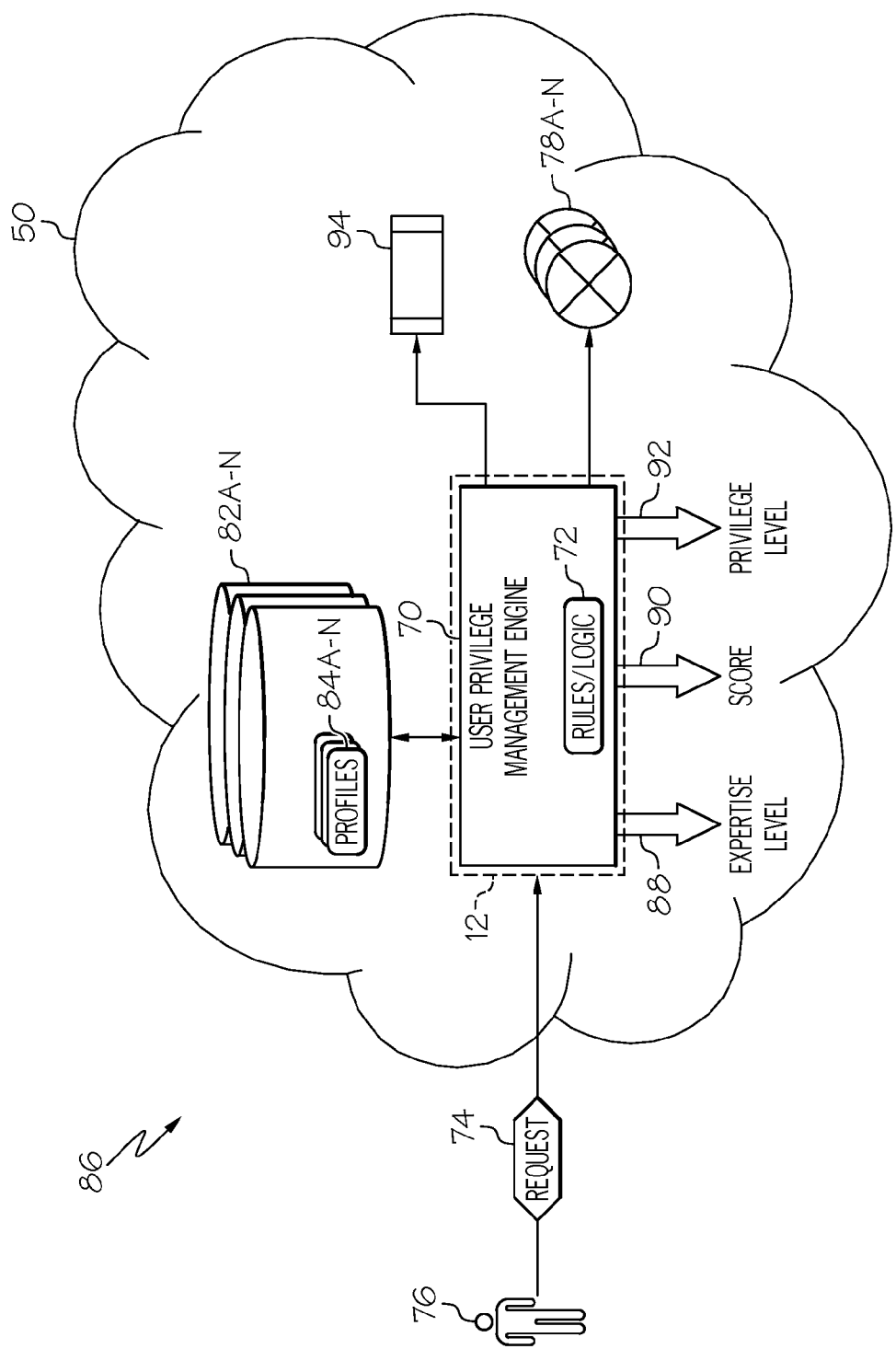
FIG. 4 depicts a system diagram according to an embodiment of the present invention.

Referring now to FIG. 4, a system diagram describing the functionality discussed herein according to an embodiment of the present invention is shown. It is understood that the teachings recited herein may be practiced within any type of networked computing environment 86 (e.g., a cloud computing environment 50). A computer system/server 12, which can be implemented as either a stand-alone computer system or as a networked computer system is shown. In the event the teachings recited herein are practiced in a networked computing environment 86, each client need not have a user privilege management engine (engine 70). Rather, engine 70 could be loaded on a server or server-capable device that communicates (e.g., wirelessly) with the clients to provide user privilege management therefor. Regardless, as depicted, engine 70 is shown within computer system/server 12. In general, engine 70 can be implemented as program/utility 40 on computer system 12 of FIG. 1 and can enable the functions recited herein. As further shown, engine 70 (in one embodiment) comprises a rules and/or computational engine that processes a set (at least one) of rules/logic 72 and/or provides user privilege management hereunder.

Along these lines, engine 70 may perform multiple functions similar to a general-purpose computer. Specifically, among other functions, engine 70 may (among other things): access, in a computer storage device 82A-N, user profile(s) 84A-N associated with a prospective user 76 of a set of computer resources 78A-N in the networked computing environment (e.g., in response to a request 74 by prospective user 76 to utilize computer resources 78A-N), the user profile(s) 84A-N comprising information pertaining to a skill level of the prospective user 76 with respect to the set of computer resources 78A-N (e.g., certifications, education, experience, job titles, affiliations, exam results associated with the prospective user, etc.); determine an expertise level 88 (e.g., the expertise level 88 ranging from beginner to expert) of the prospective user 76 with respect to the set of computer resources 78A-N based on the information contained in the user profile(s) 84A-N (e.g., based on a comparison of the information to information of other users having previously determined expertise levels); calculate a score 90 (e.g., along on a predetermined numeric scale) based on the expertise level 88; provide a level of user privileges 92 to the set of computer resources 78A-N commensurate with the score 90; configure a user interface 94 for the prospective user based on the expertise level 88, the score 90, and/or the privilege level 92; modify the expertise level 88, the score 90, and the level of user privileges in response to changes to the information.

As described above, embodiments of the present invention provide a system that determines the expertise of the person who has requested the provision/utilization of an resource in a cloud environment. The expertise of the person can be assessed through a plurality of resources such as the person's job title from a company directory, social networking data, a resume, a certification test/survey, or more. Once the user's expertise has been assessed, the privilege level granted to the user as well as the user interface will be constructed in a way that allows for either more or less advanced features to be available to the user. Additionally, after the resources are provisioned, the system may continually evolve and adapt to the professional development of the user, "unlocking" new capabilities or features commensurate with the growth of his or her experience and skills.

Illustrative Examples

Shown below are illustrative examples of how these teachings may be applied. It is understood that these examples are intended to be illustrative only and are not intended to be limiting:

I. The skills of a DB2® database (DB2 and related terms are trademarks of International Business Machines Corporation in the United States and other countries) user evolve over time:

Assume that a recent graduate familiar with a DB2 system has earned a basic certification level and commenced a position with company "ABC." Further assume that the user provisions a DB2 system from a cloud IaaS provider, which in turn recognizes the user's skill level and pre-configures the virtual machine with minimal privileges. Some period of time later, the user earns a higher level certification for DB2. At this point, the user's current DB2 system is automatically reconfigured to include additional development tools. Any new DB2 systems he provisions also include this expanded capability. Finally, assume that the user then goes on to earn an advanced level of certification. In recognition of this expertise, the system then escalates the user's privilege to include full control over the file systems, raw devices, and networking (to federated systems).

II. The skills of a project manager evolve over time:

Assume in this example that an entry level project manager (manager) joins a team at company "ABC." Further assume that the manager has an entry level certification for project management. The manager then provisions a virtual desktop (or requests an account on a SaaS system) and the system grants her a license to use a standard edition of a project management software program (with the base feature set). A period of time later, assume that the manager advances to the "Project Management Professional (PMP)" level, and the manager's virtual desktop (or SaaS) account is upgraded to "Professional Edition" of the project management software program.

In both examples above, software licenses for the end users are optimized to expose the right software or virtual machine configuration for the users commensurate with their skills and needs. This saves the company money, allocates the right resources to the right users, and prevents the end users from being overwhelmed or accidentally misusing the features and permissions they have on their respective systems.

Figure 5:
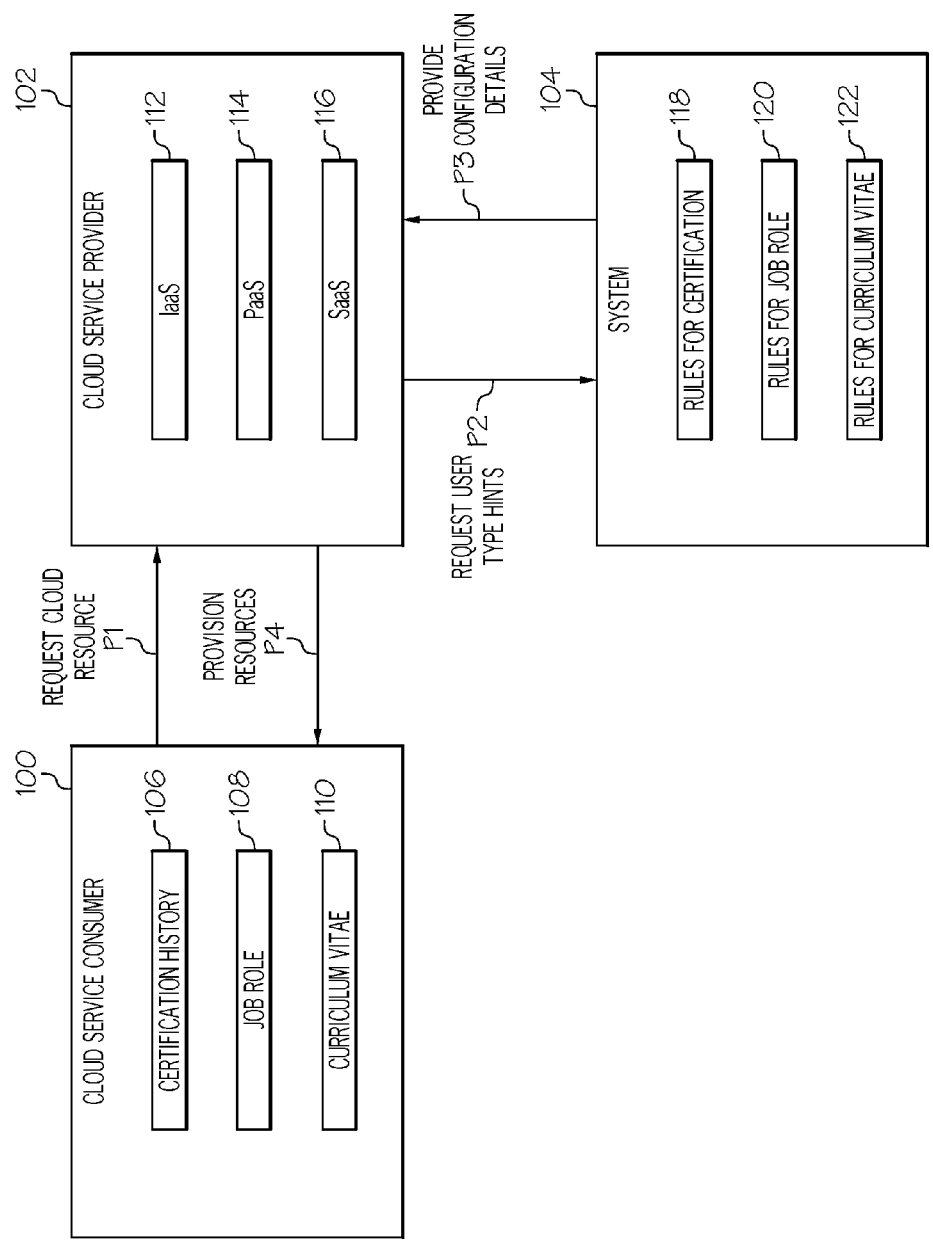
FIG. 5 depicts a process flow diagram according to an embodiment of the present invention.

Referring now to FIG. 5, an illustrative flow diagram for an initial instance configuration is shown. As depicted, a cloud service consumer/user 100 interacts with a cloud service provider 102 whose privilege levels and access controls are managed by system 104 (e.g., program 40 and/engine 70). Initially, a user profile is created that contains information about the user 100's professional skill set, such as an enterprise directory entry, as to whether he is a certified system administrator or project manager. Along these lines, the profile may include items such as certification history 106, job role 108, curriculum vitae (CV) 110, etc. In step P1, user 100 requests the provisioning and/or consumption of an IaaS 112, PaaS 114 or SaaS 116 resource from cloud provider 102. In step P2, cloud provider 102 will seek information/hints pertaining to the expertise level of user 100 based on the information available about user 100. Some example sources could be: a company's employee database that could list job title, skills, and skill levels; area of the company in which user 100 works; position history of the user 100; certifications as provided in the user 100's profile; public social networking data from various sites providing data such as activity on certain tech-specific forums/discussion boards; a copy of a resume of user 100; network affiliations of user 100; network expertise recommendations or tags associated with user 100; and/or quizzes or certification exams administered either by an outside organization or by the cloud provider 102 itself to assess the expertise level of user 100.

System 104 will analyze the user 100's profile information in order to make a recommendation about how the requested resource(s) should be configured and what security level the user 100 should be granted. Once all parameters/variables have been considered, system 104 may determine a probable level of expertise of user 100 and assign a score thereto (e.g., a numeric value, for example, on a scale of 0-10 where 0 is a beginner and 10 is an expert). The expertise level and suggested privilege level may be determined/calculated based on various rules such as rules for certification 118, rules for job role 120, and/or rules for CV 122.

In step P3, configuration details will then be provided from system 104 to provider 102 so that provider 102 may commence provisioning/allocating the resources for user 100 in step P4. System 104 may also modify or suggest modifications to any user interfaces operated by user 102 commensurate with user 100's expertise/skill level, access privileges, etc. System 104 may repeat some or all of these steps by polling the data sources for user information, or in response to pushed updates from those sources to keep the system continually optimized to match the user's skills.

Figure 6:
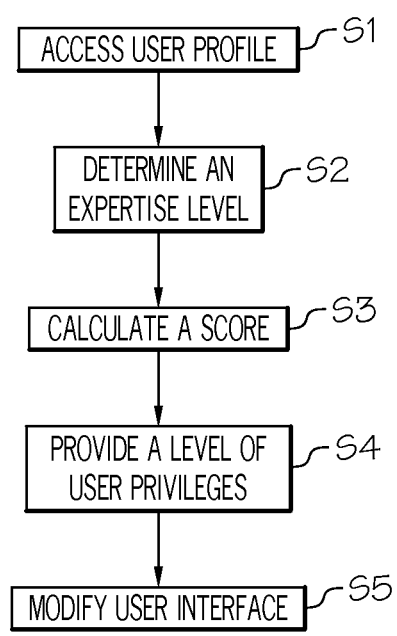
FIG. 6 depicts a method flow diagram according to an embodiment of the present invention.

Referring to FIG. 6, a method flow diagram according to an embodiment of the present invention is shown. As depicted, in step S1, a user profile associated with a prospective user of a set of computer resources in the networked computing environment is accessed. In step S2, an expertise level of the prospective user is determined with respect to the set of computer resources based on the information contained in the user profile. In step S3, a score is calculated based on the expertise level. In step S4, a level of user privileges is provided to the set of computer resources commensurate with the score. In step S5, a user interface is modified for the prospective user based on the score.

While shown and described herein as a user privilege management solution, it is understood that the invention further provides various alternative embodiments. For example, in one embodiment, the invention provides a computer-readable/useable medium that includes computer program code to enable a computer infrastructure to provide user privilege management functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide user privilege management functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for user privilege management. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method implemented by at least one computing device for managing user privileges for computer resources in a networked computing environment, comprising:
   polling at least one social networking website for data pertaining to a user of a set of computer resources in the networked computing environment;
   entering, to a user profile associated with the user, said data as information pertaining to a skill level of the user;
   accessing, in a computer storage device, the user profile associated with the user of the set of computer resources in the networked computing environment, the user profile comprising information pertaining to a skill level of the user with respect to the set of computer resources, the information comprising at least one of the following: education, experience, affiliations, exam results, or quiz results associated with the user;
   comparing the information contained in the user profile to information contained in other user profiles of other users having previously determined expertise levels;
   determining an expertise level of the user with respect to the set of computer resources based on the comparison;
   calculating a score based on the expertise level;

providing a level of user privileges for the set of computer resources commensurate with the score;
establishing at least one feature available to the user based on the score;
providing a first user interface having the at least one feature;
receiving at least one change to the information;
automatically modifying, by at least one computing device, the expertise level, the score, and the level of user privileges in response to the at least one change to the information;
modifying the features available to the user based on the at least one change to the information; and
providing a second user interface having the modified features;
wherein the networked computing environment comprises a shared pool of configurable computer resources that can be rapidly provisioned and released; and
wherein the shared pool of configurable computer resources are pooled to serve multiple consumers using a multi-tenant model, with physical resources and virtual resources dynamically assigned and reassigned according to demand.

2. The computer-implemented method of claim 1, the expertise level being determined based on a comparison of the information to information of other users having previously determined expertise levels.

3. The computer-implemented method of claim 1, further comprising configuring a user interface for the prospective user based on the score.

4. The computer-implemented method of claim 1, the expertise level ranging from beginner to expert, and the score being based on a predetermined numeric scale.

5. The computer-implemented method of claim 1, wherein the social networking site comprises at least one of a forum or discussion board.

6. A system for managing user privileges for computer resources in a networked computing environment, comprising:
a bus;
a processor coupled to the bus; and
a memory medium coupled to the bus, the memory medium comprising instructions to:
poll at least one social networking website for data pertaining to a user of a set of computer resources in the networked computing environment;
enter, to a user profile associated with the user, said data as information pertaining to a skill level of the user;
access, in a computer storage device, the user profile associated with the user of the set of computer resources in the networked computing environment, the user profile comprising information pertaining to a skill level of the user with respect to the set of computer resources, the information comprising at least one of the following: education, experience, affiliations, exam results, or quiz results associated with the user;
compare the information contained in the user profile to information contained in other user profiles of other users having previously determined expertise levels;
determine an expertise level of the user with respect to the set of computer resources based on the comparison;
calculate a score based on the expertise level;
provide a level of user privileges for the set of computer resources commensurate with the score;
establish at least one feature available to the user based on the score;
provide a first user interface having the at least one feature;
receiving at least one change to the information;
automatically modify, by the processer, the expertise level, the score, and the level of user privileges in response to the at least one change to the information;
modify the at least one feature available to the user based on the at least one change to the information;
provide a second user interface having the modified at least one feature;
wherein the networked computing environment comprises a shared pool of configurable computer resources that can be rapidly provisioned and released; and
wherein the shared pool of configurable computer resources are pooled to serve multiple consumers using a multi-tenant model, with physical resources and virtual resources dynamically assigned and reassigned according to demand.

7. The system of claim 6, the expertise level being determined based on a comparison of the information to information of other users having previously determined expertise levels.

8. The system of claim 6, the memory medium further comprising instructions to configure a user interface for the prospective user based on the score.

9. The system of claim 6, the expertise level ranging from beginner to expert, and the score being based on a predetermined numeric scale.

10. The system of claim 6, wherein the social networking site comprises at least one of a forum or discussion board.

11. A computer program product for managing user privileges for computer resources in a networked computing environment, the computer program product comprising a computer readable hardware storage device, and program instructions stored on the computer readable storage media, which when executed cause a computer to:
poll at least one social networking website for data pertaining to a user of a set of computer resources in the networked computing environment;
enter, to a user profile associated with the user, said data as information pertaining to a skill level of the user;
access, in a computer storage device, the user profile associated with the user of the set of computer resources in the networked computing environment, the user profile comprising information pertaining to a skill level of the user with respect to the set of computer resources, the information comprising at least one of the following: education, experience, affiliations, exam results, or quiz results associated with the user;
compare the information contained in the user profile to information contained in other user profiles of other users having previously determined expertise levels;
determine an expertise level of the user with respect to the set of computer resources based on the comparison;
calculate a score based on the expertise level;
provide a level of user privileges for the set of computer resources commensurate with the score;
establish at least one feature available to the user based on the score;
provide a first user interface having the at least one feature;
receiving at least one change to the information;
automatically modify, by the computer, the expertise level, the score, and the level of user privileges in response to the at least one change to the information;
modify the at least one feature available to the user based on the at least one change to the information; and provide a second user interface having the modified at least one feature;
wherein the cloud networked computing environment comprises a shared pool of configurable computer resources that can be rapidly provisioned and released; and
wherein the shared pool of configurable computer resources are pooled to serve multiple consumers using a multi-tenant model, with physical resources and virtual resources dynamically assigned and reassigned according to demand.

12. The computer program product of claim 11, the expertise level being determined based on a comparison of the information to information of other users having previously determined expertise levels.

13. The computer program product of claim 11, further comprising program instructions stored on the computer readable hardware storage device to configure a user interface for the prospective user based on the score.

14. The computer program product of claim 11, the expertise level ranging from beginner to expert, and the score being based on a predetermined numeric scale.

15. A method for deploying a system for managing user privileges for computer resources in a networked computing environment, comprising:
providing a computer infrastructure being operable to:
poll at least one social networking website for data pertaining to a user of a set of computer resources in the networked computing environment;
enter, to a user profile associated with the user, said data as information pertaining to a skill level of the user;
access, in a computer storage device, the user profile associated with the user of the set of computer resources in the networked computing environment, the user profile comprising information pertaining to a skill level of the user with respect to the set of computer resources, the information comprising at least one of the following: education, experience, affiliations, exam results, or quiz results associated with the user;
compare the information contained in the user profile to information contained in other user profiles of other users having previously determined expertise levels;
determine an expertise level of the user with respect to the set of computer resources based on the comparison;
calculate a score based on the expertise level;
provide a level of user privileges for the set of computer resources commensurate with the score;
establish at least one feature available to the user based on the score;
provide a first user interface having the at least one feature;
receive at least one change to the information;
automatically modify, by the computer infrastructure, the expertise level, the score, and the level of user privileges in response to the at least one change to the information;
modify the at least one feature available to the user based on the at least one change to the information; and
provide a second user interface having the modified at least one feature;
wherein the networked computing environment comprises a shared pool of configurable computer resources that can be rapidly provisioned and released; and
wherein the shared pool of configurable computer resources are pooled to serve multiple consumers using a multi-tenant model, with physical resources and virtual resources dynamically assigned and reassigned according to demand.

* * * * *